(12) United States Patent
Arni et al.

(10) Patent No.: US 12,085,440 B2
(45) Date of Patent: Sep. 10, 2024

(54) AUGMENTED REALITY-BASED ACOUSTIC PERFORMANCE ANALYSIS

(71) Applicant: SIGNIFY HOLDING B.V., Eindhoven (NL)

(72) Inventors: Sohana Karim Arni, Aurora, CO (US); Parth Joshi, Atlanta, GA (US); Nam Chin Cho, Peachtree City, GA (US); Adam Moore Foy, Parker, CO (US); Kenneth D. Walma, Peachtree City, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 534 days.

(21) Appl. No.: 17/440,935

(22) PCT Filed: Mar. 19, 2020

(86) PCT No.: PCT/EP2020/057665
§ 371 (c)(1),
(2) Date: Sep. 20, 2021

(87) PCT Pub. No.: WO2020/193373
PCT Pub. Date: Oct. 1, 2020

(65) Prior Publication Data
US 2022/0163375 A1    May 26, 2022

Related U.S. Application Data

(60) Provisional application No. 62/822,620, filed on Mar. 22, 2019.

(51) Int. Cl.
*G01H 7/00* (2006.01)
*G06T 11/00* (2006.01)
*G06T 19/00* (2011.01)

(52) U.S. Cl.
CPC ............... *G01H 7/00* (2013.01); *G06T 11/00* (2013.01); *G06T 19/006* (2013.01)

(58) Field of Classification Search
CPC .......... G01H 7/00; G06T 11/00; G06T 19/006
(Continued)

(56) References Cited

U.S. PATENT DOCUMENTS 10,440,498 B1 * 10/2019 Amengual Garí ....... G01H 7/00
10,937,245 B2    3/2021 Cho et al.
(Continued)

OTHER PUBLICATIONS

Mercer D M A et al: "Acoustic Design Principles", Review of Physics in Technology, Institute of Physics Publishing, Bristol, GB, vol. 2, No. 3, Jan. 1, 1971 (Jan. 1, 1971) ISSN: 0034-6683, DOI: 10.1088/0034/6683/2/3/103, Section 6.1 Reverberation time.

*Primary Examiner* — Jacinta M Crawford

(57) ABSTRACT

An augmented reality-based acoustic analysis method includes identifying structural elements of a space and determining structural parameters of the structural elements and a structural parameter of the space. The method further includes displaying, by an augmented reality (AR) device, a virtual lighting fixture model on a viewport of the AR device, where the virtual lighting fixture model is overlaid on a real-time image of the space. The method also includes determining, by the AR device, a sound reverberation time of the space based on at least a sound absorption parameter associated with the virtual lighting fixture model and a sound absorption parameter of the space determined based on the structural parameters of the structural elements and the structural parameter of the space.

13 Claims, 12 Drawing Sheets

(58) Field of Classification Search
USPC .......................................................... 345/633
See application file for complete search history.

(56) References Cited

U.S. PATENT DOCUMENTS

| | | | |
|---|---|---|---|
| 11,112,389 B1* | 9/2021 | Robinson | G01H 7/00 |
| 11,270,498 B2* | 3/2022 | Hoff, III | G06T 15/50 |
| 2016/0109284 A1 | 4/2016 | Hammershøi et al. | |
| 2017/0345216 A1 | 11/2017 | Boyle et al. | |

* cited by examiner

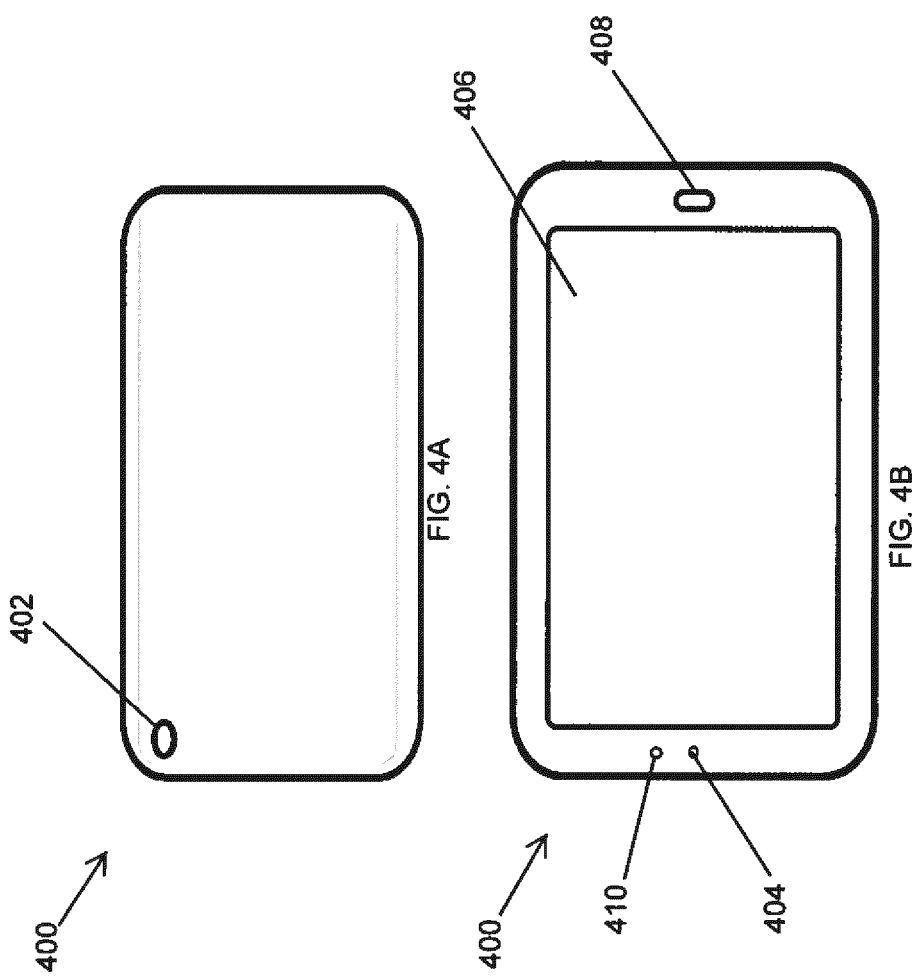

US 12,085,440 B2

AUGMENTED REALITY-BASED ACOUSTIC PERFORMANCE ANALYSIS

CROSS REFERENCE TO RELATED APPLICATIONS

This application is the U.S. National Phase application under 35 U.S.C. § 371 of International Application No. PCT/EP2020/057665, filed on Mar. 19, 2020, which claims the benefit of U.S. Provisional Application No. 62/822,620, filed on Mar. 22, 2019. These applications are hereby incorporated by reference herein.

TECHNICAL FIELD

The present disclosure relates generally to lighting systems, and more particularly to using augmented reality to estimate acoustic performance of sound absorbing lighting fixtures.

BACKGROUND

Lighting fixtures that are installed in a space (e.g., a room) may impact the sound performance of the space. For example, some installed lighting fixtures may obstruct sound paths between a sound source (e.g., a person) and a sound destination (e.g., another person). To illustrate, some installed lighting fixtures may reduce reverberations by obstructing sound paths and/or by absorbing some of the sound. However, it may be challenging to visualize the impact of lighting fixtures on the acoustic performance of a space prior to the installation of the lighting fixtures in the space. Thus, a solution that provides a user, prior to the installation of lighting fixtures, an estimate of the expected acoustic performance of a space when the lighting fixtures are later installed is desirable. Such a solution may enable lighting designs that achieve a desired acoustic performance.

SUMMARY

The present disclosure relates generally to lighting systems, and more particularly to using augmented reality to estimate acoustic performance of sound absorbing lighting fixtures. In an example embodiment, an augmented reality-based acoustic analysis method includes identifying structural elements of a space and determining structural parameters of the structural elements and a structural parameter of the space. The method further includes displaying, by an augmented reality (AR) device, a virtual lighting fixture model on a viewport of the AR device, where the virtual lighting fixture model is overlaid on a real-time image of the space. The method also includes determining, by the AR device, a sound reverberation time of the space based on at least a sound absorption parameter associated with the virtual lighting fixture model and a sound absorption parameter of the space determined based on the structural parameters of the structural elements and the structural parameter of the space.

In another example embodiment, an augmented reality-based acoustic analysis method includes displaying, by an augmented reality (AR) device, a real-time image of a space on a viewport of the AR device and receiving, by the augmented reality (AR) device, user inputs indicating structural parameters of the structural elements of the space and a structural parameter of the space. The method further includes displaying, by the augmented reality (AR) device, a virtual lighting fixture model overlaid on the real-time image of the space. The method further includes determining, by the AR device, a sound reverberation time of the space based on at least a sound absorption parameter associated with the virtual lighting fixture model and a sound absorption parameter of the space determined based on the structural parameters of the structural elements and the structural parameter of the space.

In another example embodiment, a non-transitory computer-readable medium of an augmented reality device contains instructions executable by a processor, the instructions include displaying a real-time image of a space on a viewport of the AR device and receiving user inputs indicating structural parameters of the structural elements of the space and a structural parameter of the space. The instructions further include displaying a virtual lighting fixture model overlaid on the real-time image of the space and calculating a sound reverberation time of the space based on at least a sound absorption parameter associated with the virtual lighting fixture model and a sound absorption parameter of the space determined based on the structural parameters of the structural elements and the structural parameter of the space.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein:

FIGS. 4A and 4B illustrate an augmented reality (AR) device for estimating sound reverberation times of a space based on virtual models of lighting fixtures according to an example embodiment;

Figure 1:
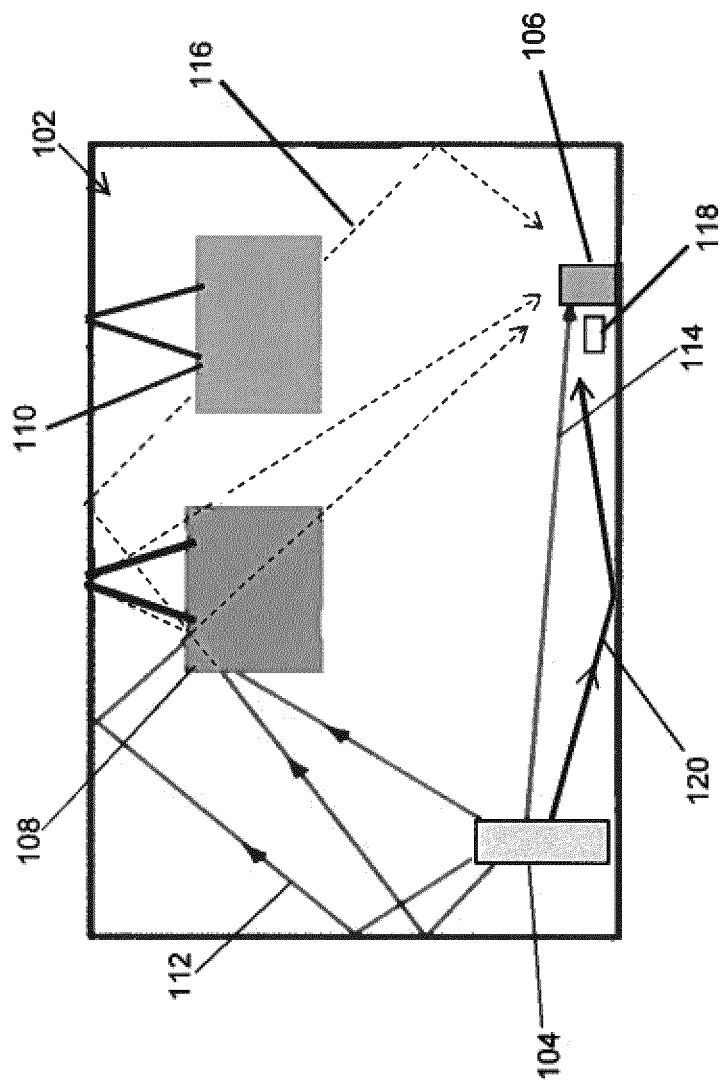
FIG. 1 illustrates estimated effects of lighting fixtures on acoustic characteristics of a space according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different drawings may designate like or corresponding but not necessarily identical elements.

DETAILED DESCRIPTION OF THE EXAMPLE EMBODIMENTS

In the following paragraphs, example embodiments will be described in further detail with reference to the figures. In the description, well-known components, methods, and/or processing techniques are omitted or briefly described. Furthermore, reference to various feature(s) of the embodiments is not to suggest that all embodiments must include the referenced feature(s).

In some cases, it is desirable to estimate, prior to installing lighting fixtures, the acoustic characteristics that a space will have after the lighting fixtures are installed in the space. Some lighting fixtures may be at least partially covered with sound absorbing material. The sound absorbing material may enable these lighting fixtures to reduce ambient noise level by reducing sound reverberation in a space. In some example embodiments, virtual models of lighting fixtures may be overlaid on a real-time image of a space (e.g., a room) displayed on an Augmented Reality (AR) device. The AR device may estimate the acoustic characteristics of the space based on the virtual models that are placed in a real-time image of the space displayed on the AR device. The AR device may display the estimated acoustic characteristics (e.g., reverberation time) on the AR device. Alternatively or in addition, the AR device may show a comparison of estimated or measured acoustic characteristics of a space without lighting fixtures and estimated acoustic characteristics of the space with lighting fixtures. For example, the AR device may estimate or measure the acoustic characteristics of the space prior to the installation of lighting fixtures and estimate the acoustic characteristics of the space based on virtual models of lighting fixtures.

Turning now to the figures, particular example embodiments are described. FIG. 1 illustrates effects of lighting fixtures 108, 110 on the acoustic characteristics of a space 102 according to an example embodiment. In some example embodiments, a sound source 104 (e.g., a person, a speaker, etc.) may produce a sound that travels in different directions as illustratively shown by arrows such as the arrows 112, 114. For example, the sound may travel directly toward a sound destination 106 (e.g., a person, a microphone, etc.) without obstruction as illustrated by the arrow 114. The sound may additionally take indirect paths to the sound destination 106 as shown by the arrows 112, 120. For example, the sound may reflect off one or more walls, a ceiling, and/or a floor as well as other structures (e.g., a table surface, etc.) before reaching the sound destination 106.

In some example embodiments, the lighting fixtures 108, 110 may obstruct some of the paths of the sound produced by the sound source 104. For example, parts of the lighting fixtures 108, 110 may include or may be covered by a sound absorbing material that can absorb some of the sound. To illustrate, the dotted arrows, such as the arrow 116, may represent paths that the sound from the sound source 104 would take if it were not obstructed by the lighting fixtures 108, 110. Instead of reflecting the sound, the lighting fixtures 108, 110 may absorb some of the sound. Such absorption of sound by the lighting fixtures 108, 110 may result in reduced sound reverberation time in the space 102. The amount of reduction in the reverberation time depends on the sound absorption characteristics of the lighting fixtures 108, 110.

In some example embodiments, the amount of reduction in reverberation that can be achieved by installing lighting fixtures 108, 110 in the space 102 may be estimated before the lighting fixtures 108, 110 are installed. For example, prior to the installation of the lighting fixtures 108, 110 in the space 102, an AR device 118 (e.g., a laptop, a tablet, a mobile phone, etc.) may estimate, based on virtual models of the lighting fixtures 108, 110, the reverberation time that the space 102 will have when the lighting fixtures 108, 110 are later installed in the space 102. The AR device 118 may estimate reverberation times (e.g., reverberation time 60 (RT60)) for different tones. To illustrate, prior to the installation of the lighting fixtures 108, 110, the AR device 118 may estimate reverberation times based on a number of parameters including the volume (i.e., dimensional volume) of the space 102, surface areas of surfaces of structural elements of the space 102, the material (e.g., glass, gypsum, concrete, etc.) of the structural elements, and the sound absorbing characteristics of the lighting fixtures 108, 110 represented by virtual models. In some cases, the sound absorbing characteristics of each lighting fixture 108, 110 may be defined based on the separation between the particular lighting fixture 108, 110 and other lighting fixtures. For example, the virtual models representing the lighting fixtures 108, 110 may each be defined as requiring a 7.5 feet, 8.5 feet, or another size separation from other lighting fixtures. To illustrate, a label associated with a virtual model may indicate the separation required between the corresponding lighting fixture and another lighting fixture that may be installed in the space 102.

In some example embodiments, the AR device 118 may execute software code to determine some or all of the parameters that are used to estimate reverberation times. Alternatively or in addition, the AR device 118 may receive user inputs that provide some or all of the relevant information. The AR device 118 may also enable a user to place virtual models of the lighting fixtures 108, 110 on the display screen of the AR device 118 such that the virtual models are overlaid on a real-time image of at least a portion of the space 102. The AR device 118 may determine expected separation between the lighting fixtures 108, 110 based on the separation of the virtual models that are overlaid on the real-time image of the space 102.

In some example embodiments, prior to the installation of the lighting fixtures 108, 110, the AR device 118 may estimate sound reverberation times (e.g., RT60) of the space 102 without considering the sound absorption characteristics of the lighting fixtures 108, 110. For example, the AR device 118 may use the parameters including the volume (i.e., dimensional volume) of the space 102, surface areas of surfaces of structural elements of the space 102, and the material (e.g., glass, gypsum, concrete, etc.) of the structural elements to estimate the sound reverberation times (e.g., RT60) in the space 102 prior to the installation of the lighting fixtures 108, 110. The AR device 118 may estimate the reverberation time for different tones, and these reverberation times of the space 102 estimated without considering the sound absorption characteristics of the lighting fixtures 108, 110 may be compared against reverberation times of the space 102 that are estimated based on the sound absorbing characteristics of the lighting fixtures 108, 110. Such comparisons may indicate the sound performance improvement that can be achieved by installing the lighting fixtures 108, 110 and may help to more clearly understand the expected impact of the lighting fixtures 108, 110 on the sound performance of the space 102.

In some example embodiments, the AR device 118 or another user device may be used to measure, instead of estimate, reverberation times for different tones (i.e., different frequency sounds) before the lighting fixtures 108, 110 are installed in a similar manner as described below with respect to FIG. 2. To illustrate, before the installation the lighting fixtures 108, 110, the reverberation times may be measured and compared against the reverberation times that are estimated based on the sound absorbing characteristics of the lighting fixtures 108, 110 prior to the installation of the lighting fixtures 108, 110. For example, the AR device 118 may include a speaker to generate a tone and a microphone to receive a returning sound resulting from the generated tone. Such comparisons may indicate the sound performance improvement that can be achieved by installing the lighting fixtures 108, 110.

In some example embodiments, to estimate reverberation times for different tones, the AR device 118 may execute software code including an AR application. The AR device 118 may also execute a software code to identify structural elements of the space 102. To illustrate, the AR device 118 may identify structural elements such as walls, a floor, a ceiling, etc. The AR device 118 may also determine the material of the structural elements of the space 102. For example, the AR device 118 may determine the material (e.g., gypsum) of walls, a ceiling, and a floor of the space 102. The AR device 118 may also determine the surface areas of the surfaces of the structural elements of the space 102. The AR device 118 may also execute software code to determine the volume of the space 102. To illustrate, the AR device 118 may determine the volume of the space 102 based on dimensions of some of the structural elements of the space 102. For example, the surface areas of the floor and the ceiling along with the height of the ceiling may be used to determine the volume of the space 102. To illustrate, the AR device 118 may execute a software code to determine the height of the ceiling of the space 102. In some example embodiments, instead of or in addition to the AR device 118 identifying/determining surfaces, dimensions, etc., the AR device 118 may receive user inputs that provide some or all of the relevant information.

In some example embodiments, prior to the installation of the lighting fixtures 108, 110, the AR device 118 may execute a software code to display, in response to a user input provided to the AR device 118 virtual models of the lighting fixture 108, 110 and/or other virtual models of lighting fixtures on the display screen of the AR device 118. The virtual models can be displayed overlaid on a real-time image of at least a portion of the space 102. The AR device 118 may also execute a software code to measure reverberation times by generating tones via a speaker, by receiving the returning tones via a microphone, and by processing the received tones to determine the reverberation times as can be readily understood by those of ordinary skill in the art with the benefit of this disclosure. For example, the AR device 118 may generate different tones one tone at a time and receive the sounds that return back after reflection on structural elements such as walls, ceilings, floor, etc. in the space 102.

Estimating or measuring the acoustic performance of a space prior to the installation of lighting fixtures and without considering the acoustic characteristics of the lighting fixtures provides a baseline for determining the relative acoustic performance improvement that can be achieved by installing the lighting fixtures. By estimating, prior to installation, the relative improvement in acoustic performance (e.g., reduction in reverberation time) that can be achieved by installing lighting fixtures, lighting designers, acoustics engineers, and others are able to select appropriate lighting fixtures for a particular space.

In some alternative embodiments, the space 102 may include more or fewer lighting fixtures than shown without departing from the scope of this disclosure. In some alternative embodiments, the sound source 104 and the sound destination 106 may be at different locations than shown without departing from the scope of this disclosure.

Figure 2:
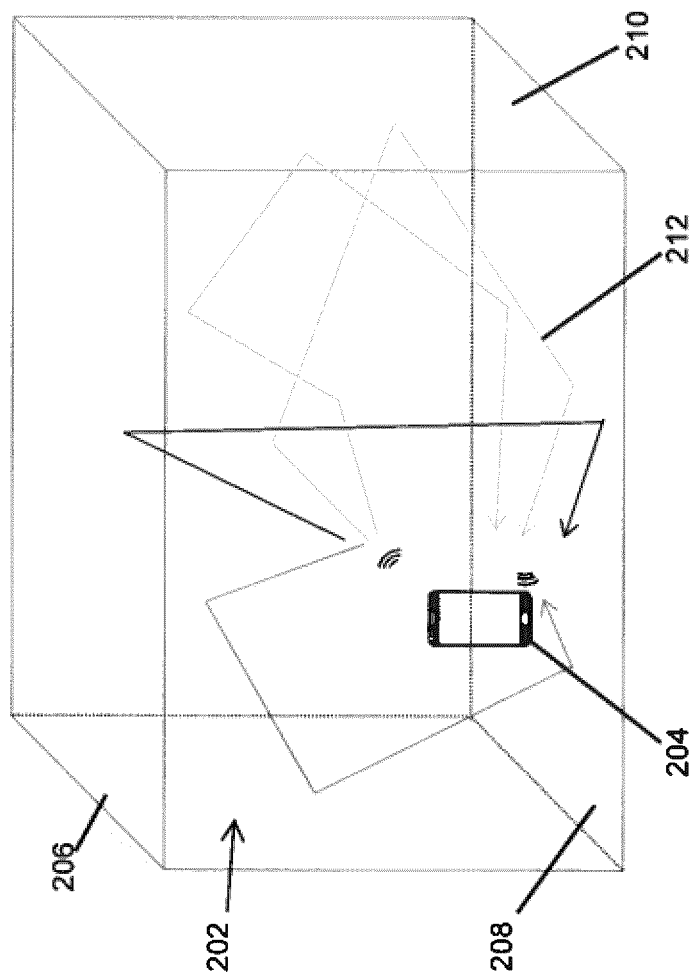
FIG. 2 illustrates a user device for measuring sound reverberation times in a space according to an example embodiment.

FIG. 2 illustrates a user device 204 (e.g., a laptop, a tablet, a mobile phone, etc.) for measuring sound reverberation times in a space 202 (e.g., a room) according to an example embodiment. In some example embodiments, the user device 204 may be the AR device 118 of FIG. 1. In some example embodiments, the user device 204 may generate predefined tones, for example, one tone at a time. For example, the predefined tones may range from 200 Hz to 20 kHz. To illustrate, a predefined tone may have a frequency of 200 Hz, 500 Hz, 1 kHz, 2 kHz, 5 kHz, 15 kHz, or 20 kHz. The user device 204 may generate the tones at a set volume level. As illustrated in FIG. 2, a tone generated by a speaker of the user device 204 may reflect off structural elements of the space 202, such as a wall 210, a ceiling 206, a floor 208, etc. before returning to the user device 204. Arrows, such as the arrow 212, illustratively represent paths that the tone may take before returning to the user device 204 and is received by the microphone of the user device 204.

For each tone generated by the user device 204, the user device 204 may receive a returning tone and record the sound pressure (dB) level. For each tone generated by the user device 204, the user device 204 may also determine and record the time difference between start time (i.e., time at the generation of the tone) and receive time (i.e., time at reception of the tone by the user device 204) for various sound pressure (dB) levels until the returning tone is no longer detected or is below a threshold level. After determining or otherwise obtaining information for one tone, the user device 204 generates another tone and performs the same operations until relevant information is determined or obtained with respect to the different predefined tones.

For each tone generated by the user device 204, the user device 204 may determine the reverberation time (e.g., RT20, RT30, RT60, etc.) based on the acquired information. If the user device 204 is unable to determine the time difference for a desired sound pressure (dB) level (e.g., −60 dB), the user device 204 may extrapolate the time difference or the desired RT60 information from the information obtained for other sound pressure (dB) levels or other reverberation times (e.g., RT20).

In some example embodiments, reverberation times that are determined for the space 202 may be used for other spaces that have similar structural elements and similar dimensions. For example, if another space has similar structural elements and dimensions as well as structural elements made from the same or similar materials as the structural elements of the space 202, the reverberation times measured for the space 202 may be considered as being application to the other space.

In some example embodiments, the information obtained and determined by the user device 204 may be used to make suggestions about the type of lighting fixture to install in the space 202. For example, the user device 204 may execute a software code or application to monitor the space 202 for a period of time and evaluate noise frequency responses of the space 202. To illustrate, the user device 202 may receive sounds generated by other sources instead of generating predefined tones. The user device 204 may analyze the noise frequency responses based on the monitored sounds. Based on the analysis, the user device 204 may suggest the number and types of lighting fixtures that may be effective in reducing noise levels (e.g., by reducing reverberation times) in the space 202. The user device 204 may also suggest the type (active or passive) of product based on the type of noise reduction (frequency) provided via passive or active acoustic suppression products and the noise frequency responses.

In some example embodiments, voice activation may be used to initiate the measurements of reverberation times. For example, the user device 204 may respond to voice command and start measurements of reverberation times by transmitting the predefined tones as described above. Alternatively, a voice interaction device (e.g., a smart speaker) may transmit a command to the user device 204 or to another sound source device to start generating predefined tones. For example, a smart speaker may respond to a voice command from a person and may send a corresponding command to the user device 204 or to another sound source device to start measurements of reverberation times. In some example embodiments, the user device 204 may be at a different location in the space 202 from the sound source device and may measure the tones generated by the sound source device in response to the voice command or the command transmitted by the smart speaker.

In some alternative embodiments, the separate sound source and sound receiving devices may be used without departing from the scope of this disclosure. In some alternative embodiments, the space 202 may have a different shape than shown without departing from the scope of this disclosure.

Figure 3:
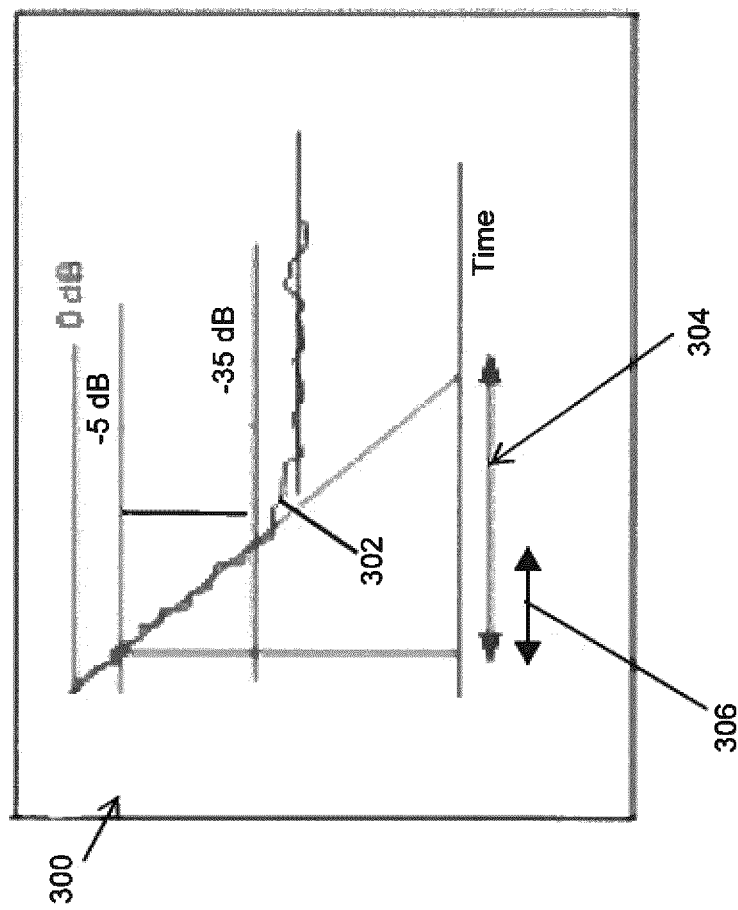
FIG. 3 illustrates a graph showing a reverberation time of a sound according to an example embodiment.

FIG. 3 illustrates a graph 300 showing reverberation time 304 of a sound according to an example embodiment. Referring to FIGS. 2 and 3, the sound represented by the graph 300 may be one of the tones generated by the user device 204 of FIG. 2. The sound pressure (dB) level of the returning sound received by the user device 204 is represented by the line 302. For example, the time difference between the −5 dB level and the −35 dB level may be the 30 dB reverberation time (RT30) 306. The reverberation time 304 may be the 60 dB reverberation time (RT60) and may be determined by extrapolation based on the information from the other sound pressure (dB) levels and time differences as can be readily understood by those of ordinary skill in the art with the benefit of this disclosure.

FIGS. 4A and 4B illustrate an augmented reality (AR) device 400 for estimating sound reverberation times of a space based on virtual models of lighting fixtures according to an example embodiment. FIG. 4A illustrates a back side of the AR device 400, and FIG. 4B illustrates the front side of the AR device 400. For example, the augmented reality device 400 may be a tablet, a smartphone, etc. Alternatively, the augmented reality device 400 may be a headset, glasses, goggles, or another type of device with an augmented reality capable display. In some example embodiments, the AR device 400 may correspond to the AR device 118 of FIG. 1 and the user device 204 of FIG. 2.

Referring to FIGS. 1, 2, 4A and 4B, in some example embodiments, the AR device 400 may include a back-facing camera 402 on a back side of the augmented reality device 400. The AR device 400 may also include a viewport/display screen 406 on a front side of the augmented reality device 400. In some example embodiments, the AR device 400 may also include a front-facing camera 404, a user input area 408, an ambient light sensor 410, accelerometers, and/or other sensors useful in determining orientation and other information for use in generating and displaying an AR image on the viewport 406.

In some example embodiments, the viewport 406 may be used to display images as seen by the cameras 402, 404 as well as to display objects (e.g., icons, text, etc.) stored, received, and/or generated by the AR device 400. The viewport 406 may also be used as a user input interface for the AR device 400. For example, the viewport 406 may be a touch sensitive display screen.

In some example embodiments, an image of a physical space in front of the AR device 400 may be displayed on the viewport 406 in real time as viewed by the camera 402. For example, the AR device 400 may include an AR software application that, when executed by the AR device 400, activates the camera 402 such that a real-time image of the physical space viewed by the camera 402 is displayed on the viewport 406.

In some example embodiments, the AR device 400 may include an executable AR software application that includes or activates other software components that are used to identify surfaces in a physical space viewable of the camera 402, determine dimensions and/or surface areas of surfaces of structural elements (e.g., a floor, a ceiling, walls, tables, etc.) in and of the physical space, determine the volume of the physical space, determine materials (e.g., concrete, gypsum, glass, carpet, etc.) that structural elements in the physical space are made of, determine locations of objects in the physical space, determine a height of a ceiling or another structure, display images captured by the camera 402, display virtual models (e.g., 3-D models) overlaid on a real-time image of the physical space displayed on the viewport 406, activate hardware components of the AR device 400, etc.

In some example embodiments, the AR device 400 may execute the AR application to determine spatial information of a space viewable by the camera 402, 404. For example, the spatial information may include identification and/or locations of a ceiling, walls, a floor, etc. and height of a ceiling, height of other objects that are in a physical space, such as the spaces 102 and 202 of FIGS. 1 and 2, respectively.

In some example embodiments, the AR application may incorporate or interface with an AR software, such as ARKit, ARCore, Holokit, etc. to perform spatial mapping. For example, the AR device 400 may execute that software code, such as software modules of HoloToolkit, to identify surfaces within a physical space. For example, PlaneFinding and SurfacePlane.prefab and SurfacePlane.cs that are referenced by the SurfaceMeshesToPlanes components in HoloToolkit may be used to find planar surfaces and classify the surfaces as a floor, a wall, a ceiling, etc. In some alternative embodiments, other AR/mixed reality (MR) toolkits, and/or software developer's kits may be used to perform spatial mapping and other operations. In some example embodiments, the AR device 400 may include an artificial intelligence application and/or software component (e.g., standalone or integrated in the AR application) that can identify surfaces and/or structures, such as windows, ceilings, walls, floors, tables, etc. in a physical space based on images captured by the AR device 400.

In some example embodiments, instead of executing AR applications or other code to determine some of the information as described above, the AR device 400 may receive some of the information from a user via user inputs. For example, a user may provide inputs to the AR device via the viewport 406. To illustrate, a user may provide inputs to the AR device 400 based on a real-time image of the physical space displayed on the viewport 406. For example, a user may draw lines around a boundary of a surface and identify the surface, for example, via a menu selection as a floor, a wall, a ceiling, etc. The user may also provide the surface area of the indicated surface as an input to the AR device 400. The user may also provide as input to the AR device 400 the material (e.g., glass, gypsum, etc.) of the structural element that includes the indicated surface. As another example, a user may provide as input to the AR device 400 the volume of the physical space to enable the AR device to estimate reverberation times.

Figure 10:
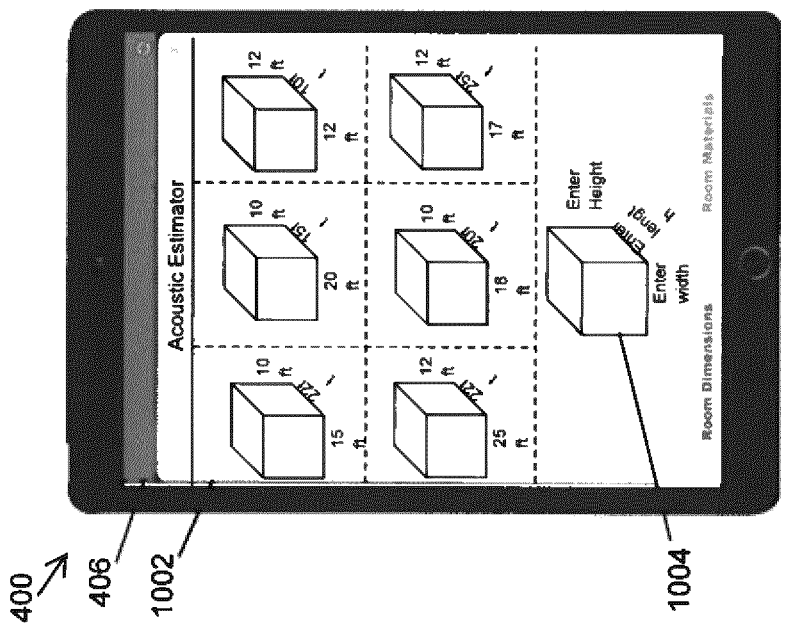
FIG. 10 illustrates a menu of predefined-size spaces for indicating the size of a space that is evaluated for acoustic performance according to an example embodiment.

For example, FIG. 10 illustrates a menu 1002 of spaces with predefined sizes for selection by a user to indicate the size of a physical space to be evaluated for acoustic performance according to an example embodiment. To illustrate, a user may select a particular menu item from the menu items displayed on the viewport 406 of the AR device 400. For example, the selected menu item may indicate dimensions that closely match the physical space to be evaluated. Alternatively, a user may enter values for the different dimensions (e.g., width, length, height, etc.) of the physical space based on a representative displayed object 1004. A user may also provide an input indicating the material of the different structural elements (e.g., walls, floor, ceiling, etc.) represented by the sides of a selected menu item or representative displayed object 1004.

In some example embodiments, after determining or receiving dimension and other relevant information about a physical space, the AR device 400 may execute the AR software application, which includes or activates other software components, to generate predefined tones, to receive returning sounds, and to determine reverberation times (e.g., RT60) in a similar manner as described with respect to FIGS. 1 and 2. In some example embodiments, the AR device 400 may execute the AR software application, which includes or activates other software components, to estimate reverberation times (e.g., RT60) in a similar manner as described with respect to FIGS. 1 and 2.

In some example embodiments, the AR device 400 may include a software component or application that is executable to determine the location of the AR device 400 itself and the locations of objects that are displayed on the viewport 406. To illustrate, the AR device 400 may determine the location of the AR device 400 in GPS coordinates or other location parameters (e.g., relative to a reference location in a space). For example, a virtual lighting fixture model may be overlaid on a real-time image of a physical space displayed in the viewport 406 such that the virtual lighting fixture model is anchored to the particular physical location when viewed through the viewport 406. The AR device 400 may also determine the separation between virtual lighting fixture models that are overlaid on the real-time image of a physical space displayed on the viewport 406. Because the virtual models are anchored to locations in the physical space (e.g., the space 102) as viewed on the viewport 406, the separation between virtual lighting fixture models represents the separation between the corresponding lighting fixtures that may be later installed in the physical space. As described above, because the sound absorbing effect of lighting fixtures represented by the virtual lighting fixture models may depend on the separation between the lighting fixtures (when later installed), the separation between the lighting fixture models as determined by the AR device 400 or from a user input is important to reliably estimate the reverberation times.

Figure 4C:
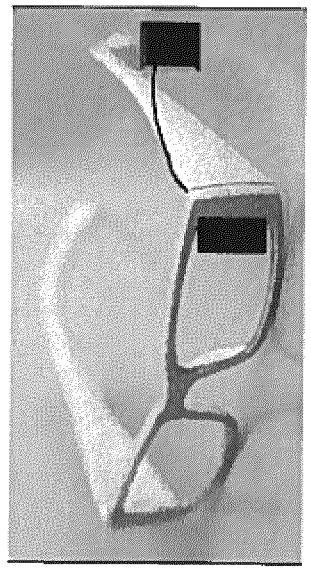
FIGS. 4C and 4D illustrate augmented reality devices for estimating sound reverberation times of a space based on virtual models of lighting fixtures according to another example embodiment.
Figure 4D:

FIGS. 4C and 4D illustrate augmented reality devices 420, 430 for estimating sound reverberation times of a space based on virtual models of lighting fixtures according to another example embodiment. In some example embodiments, the AR devices 420, 430 may be used to perform the operations described above with respect to the AR device 400. For example, the glass screens of the devices 420, 430 may be used as display screens similar to the viewport 406 of the AR device 400. In some example embodiments, AR device other than the AR devices 420, 430 may be used to perform the operations performed by the AR device 400 in a similar manner as described above with respect to FIGS. 4A and 4B. In general, the descriptions provided herein with respect to the AR device 400 are equally applicable to the AR devices 420, 430 of FIGS. 4C and 4D.

Figure 5:
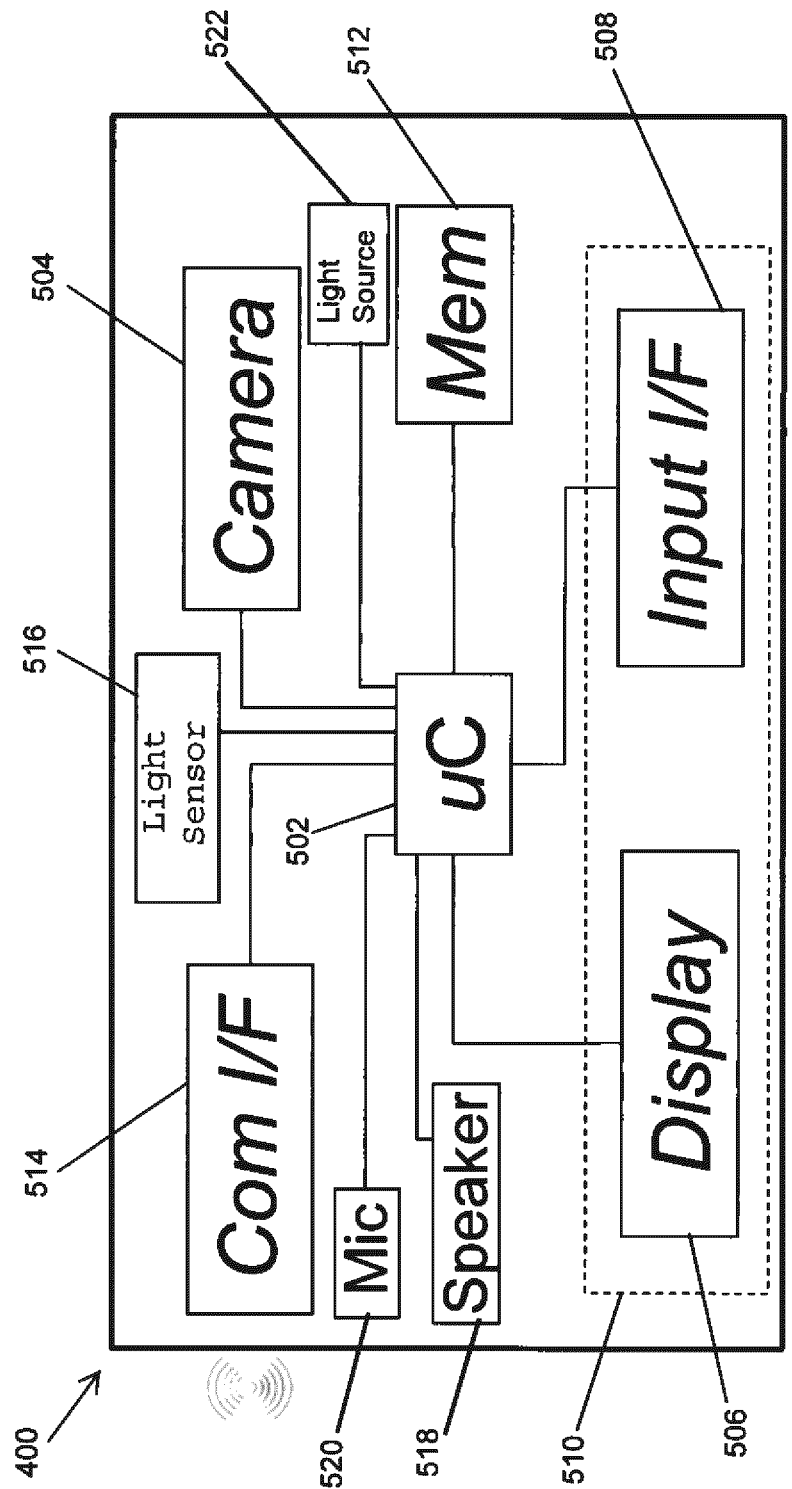
FIG. 5 illustrates a block diagram of the augmented reality device of FIGS. 4A and 4B according to an example embodiment.

FIG. 5 illustrates a block diagram of the augmented reality device 400 of FIGS. 4A and 4B according to an example embodiment. In some example embodiments, the block diagram shown in FIG. 5 may correspond to the augmented reality devices 420, 430 of FIGS. 4C and 4D. Referring to FIGS. 4A, 4B, and 5, in some example embodiments, the AR device 400 includes a controller 502, a camera component 504, a display component 506, an input interface 508, a memory device 512 (e.g., flash memory or another non-transitory memory device), and a communication interface 514. For example, the camera component 504 may correspond to or operate with the cameras 402, 404. The display component 506 may correspond to or may be part of the viewport/display screen 406 and may include circuitry that enables or performs the displaying of information (e.g., images, text, etc.) on the viewport 406. The input interface 508 may correspond to the user input area 408 and/or the user input components of the viewport 406. The communication interface 514 may be used for communication, wirelessly or via a wired connection, by the AR device 400.

In some example embodiments, the AR device 400 may also include a speaker 518 to output sounds (e.g., predefined tones), a microphone 520 to receive sounds. For example, the AR device 400 may execute software code to determine the material of a structural element (e.g., a wall, a floor, a ceiling, etc.) based on acoustic response of the structural element. The AR device 400 may also include a light sensor 516 (e.g., a visible light sensor and/or an infrared light sensor) and a light source that emits a visible light and/or infrared light. For example, the AR device 400 may execute software code to determine the material of a structural element (e.g., a wall, a floor, a ceiling, etc.) based on the response of a surface of the structural element to visible light. As another example, the AR device 400 may execute software code to determine the material of a structural element (e.g., a wall, a floor, a ceiling, etc.) based on infrared analysis of a surface of the structural element.

In some example embodiments, the controller 502 may include one or more microprocessors and/or microcontrollers that can execute software code stored in the memory device 512 or in another device to implement operations described herein with respect to the devices 118, 204, 400, 420, 430. For example, the software code of an AR application may be stored in the memory device 512 or retrievable from a remote storage location (e.g., cloud service or remotely located server or database) via the communication interface 514 or via other communication means. Other executable software codes used in the operation of the AR device 400 may also be stored in the memory device 512 or in another memory device of the AR device 400. For example, artificial intelligence and/or other software codes may be stored in the memory device 512 as part of the AR application or along with the AR application and may be executed by the controller 502.

In some example embodiments, the memory device 512 may include a non-volatile memory device and volatile memory device. Data that is used or generated in the execution of AR application(s) and other codes may also be retrieved and/or stored in the memory device 512 or in another memory device of the AR device 400 or retrieved from a remote storage location (e.g., cloud service or remotely located server or database) via the communication interface 514 or other communication means. For example, virtual models of lighting fixtures along with respective sound absorbing characteristics of the lighting fixtures may be stored in the memory device 512 and retrieved from the memory device 512. As another example, acoustic absorption coefficients of different materials at different sound frequencies as shown in Table 1 below may be stored in the memory device 512. The acoustic absorption coefficients may be used to estimate sound reverberation times (e.g., RT60) of the space as described below.

Acoustic addition values that represent sound absorbing characteristics of lighting fixtures at different sound frequencies as shown in Table 2 below may also be stored in and retrieved from the memory device 512. Prior to the installation of lighting fixtures, the acoustic addition values may be used to estimate, based on virtual models of the lighting fixtures, reverberation times (e.g., RT60) of the space when the lighting fixtures are later installed in the space. The acoustic addition values in Table 2 may have been empirically determined values or may be calculated values.

TABLE 2

| ACOUSTIC ADDITIONS | Frequency (Hz) | | | | | |
|---|---|---|---|---|---|---|
| (SABINS/UNIT) [ft^2] | 125 | 250 | 500 | 1000 | 2000 | 4000 |
| LF1 Trap (7.5' spacing) | 55.6 | 49.2 | 50.1 | 55.5 | 62.4 | 60.5 |
| LF2 Box (8.5' spacing) | 46.3 | 40.6 | 41.1 | 45.7 | 53.1 | 52.1 |
| LF3 Box (3' spacing) | 19.4 | 18.2 | 19.7 | 23.3 | 25.4 | 24.6 |

In some example embodiments, the AR application stored in the memory device 512 may incorporate or interface with an augmented reality application/software, such as ARKit, ARCore, Holokit, etc. The augmented reality application/software may also be stored in the memory device 512 or called upon from or provided via a remote storage location (e.g., cloud service or remotely located server or database) via the communication interface 514 or other communication means.

The controller 502 may communicate with the different components of the AR device 400, such as the camera component 504, etc., and may execute relevant code, for example, to display a real-time image as viewed by the camera 402 and/or 504 as well as other image objects on the viewport 406.

TABLE 1

| | Frequency (Hz) | | | | | |
|---|---|---|---|---|---|---|
| | 125 | 250 | 500 | 1000 | 2000 | 4000 |
| CEILING MATERIALS | | | | | | |
| Concrete ceiling | 0.01 | 0.01 | 0.015 | 0.02 | 0.02 | 0.025 |
| Rough concrete | 0.02 | 0.03 | 0.03 | 0.03 | 0.04 | 0.07 |
| Metal Roof Deck without Insulation | 0.12 | 0.24 | 0.2 | 0.14 | 0.07 | 0.18 |
| Gypsum Board | 0.29 | 0.18 | 0.1 | 0.05 | 0.07 | 0.09 |
| Acoustical tile, suspended | 0.76 | 0.93 | 0.83 | 0.99 | 0.99 | 0.94 |
| FLOOR MATERIALS | | | | | | |
| Carpet on Concrete | 0.02 | 0.06 | 0.14 | 0.37 | 0.6 | 0.65 |
| Carpet, light or mat | 0.05 | 0.1 | 0.15 | 0.25 | 0.35 | 0.4 |
| Concrete or terrazzo | 0.01 | 0.01 | 0.015 | 0.02 | 0.02 | 0.02 |
| linoleum on concrete | 0.02 | 0.03 | 0.03 | 0.03 | 0.03 | 0.03 |
| Marble or glazed tile | 0.01 | 0.01 | 0.01 | 0.01 | 0.02 | 0.02 |
| Wooden floor on concrete | 0.01 | 0.01 | 0.01 | 0.07 | 0.06 | 0.07 |
| WALL MATERIALS | | | | | | |
| Gypsum Wall Board | 0.29 | 0.18 | 0.1 | 0.05 | 0.07 | 0.09 |
| Plaster on solid | 0.02 | 0.02 | 0.03 | 0.04 | 0.04 | 0.05 |
| Brick (un-painted) | 0.03 | 0.03 | 0.03 | 0.04 | 0.05 | 0.06 |
| Brick (painted) | 0.01 | 0.01 | 0.02 | 0.02 | 0.02 | 0.03 |
| Concrete Block (un-painted) | 0.36 | 0.44 | 0.31 | 0.29 | 0.39 | 0.25 |
| Concrete Block (painted) | 0.05 | 0.05 | 0.06 | 0.07 | 0.09 | 0.08 |
| Wood paneling, 1/4-in, with airspace behind | 0.42 | 0.21 | 0.1 | 0.08 | 0.06 | 0.06 |
| Wood paneling, <1/2" thick | 0.28 | 0.24 | 0.17 | 0.09 | 0.09 | 0.1 |
| Wood paneling, >1/2" thick | 0.13 | 0.12 | 0.1 | 0.09 | 0.08 | 0.09 |
| Wood paneling, 1-in, with airspace behind | 0.19 | 0.14 | 0.09 | 0.06 | 0.06 | 0.05 |
| Fiberglass form board, 2" | 0.33 | 0.67 | 0.99 | 0.99 | 0.94 | 0.9 |
| Steel | 0.05 | 0.1 | 0.1 | 0.1 | 0.07 | 0.02 |
| Painted Glass | 0.265 | 0.155 | 0.11 | 0.075 | 0.045 | 0.03 |
| Glass, ordinary window glass | 0.35 | 0.25 | 0.18 | 0.12 | 0.07 | 0.04 |
| Windows, heavy glass | 0.18 | 0.06 | 0.04 | 0.03 | 0.02 | 0.02 |

Although the block diagram of FIG. 5 is described above with respect to the AR device 400, the block diagram and the above description are equally applicable to the AR devices 420, 430 of FIGS. 4C and 4D. In some example embodiments, the AR device 400 includes other components than shown without departing from the scope of this disclosure. In some example embodiments, the AR device 400 may include more or fewer components or a different configuration of components than shown without departing from the scope of this disclosure.

Figure 6:
FIG. 6 illustrates a real-time image of a physical space displayed on the AR device of FIG. 4A incorporating an AR-based acoustic characteristic estimating application according to an example embodiment.

FIG. 6 illustrates a real-time image 602 of a physical space displayed on the AR device 400 incorporating an AR-based acoustic characteristic estimating application according to an example embodiment. To illustrate, after the AR application is started, for example, by selecting an AR application icon displayed on the viewport 406, the real-time image 602 of the physical space 604 may be displayed on the viewport 406. The real-time image 602 displayed on the viewport 406 may be an image of the physical space 604 as viewed by the back-facing camera 402. For example, structural elements, such as parts of walls 610, 612, a part of a ceiling 614, and a part of a floor 616, in the physical space 604 are shown in the real-time image 602. The back-facing camera 402 may be enabled/activated to view (not necessarily record) the physical space 604 in response to the activation of the AR application. In some alternative embodiments, the back-facing camera 402 may be enabled/activated separately after the AR application is started.

In some example embodiments, the AR device 400 may be used to identify objects, structures, surfaces, etc. in the physical space 604 as described above. For example, AR device 400 may identify objects, structures, surfaces, etc. by executing artificial intelligence and image processing software codes. To illustrate, the AR device 400 may identify light reflective (e.g., mirror), transmissive (e.g., windows), ceilings, walls, floor, furniture, etc. based on the real-time image 602 of the physical space 604, the lighting conditions of the physical space 604, the orientation of the AR device 400, etc. For example, the AR device 400 may identify the walls 610, 612, the ceiling 614, the floor 616, and other walls in and of the space 604. The AR device 400 may include and use one or more accelerometers to determine the orientation of the AR device 400 relative to the physical space 604 and thus may determine orientations of objects, structures, surfaces, etc. in the physical space 604 based on the real-time image 602 of the physical space 604 as captured by the camera 402. In some alternative embodiments, a user may provide inputs to the AR device 400 by drawing boundaries around each of the walls 610, 612, the ceiling 614, the floor 616, and other walls in and of the space 604. For example, a user holding the AR device 400 may move the AR device 400 to capture the walls 610, 612, the ceiling 614, the floor 616, and other walls by the camera 402 and draw the boundaries of the walls 610, 612, the ceiling 614, the floor 616, and other walls to indicate to the AR device 400 the boundaries of the structural elements. The user may also indicate whether each structural element is a wall, a floor, etc.

In some example embodiments, the AR device 400 senses and tracks its own location within the space 604 and may subsequently suggest a physical location either for the placement of sound absorbing lighting fixtures or other sound-based products, such as voice enabled products, to maximize reception.

In some example embodiments, the AR device 400 may determine the volume of the space 604, for example, based on the surface areas of the ceiling 614 and the floor 616 and based on the height of the ceiling 614. For example, the AR device 400 may determine the surface areas of the ceiling 614 and the floor 616 and the height of the ceiling 614, or the user may provide the parameters to the AR device 400. Alternatively, the AR device 400 may determine the volume of the space 604 using other methods as can be readily understood by those of ordinary skill in the art with the benefit of this disclosure.

In some example embodiments, the AR device 400 may also determine surface areas of the walls 610, 612 as well as other walls of the space 604. For example, the space 604 may include walls that are respectively opposite the walls 610, 612. The space 604 may also include partial walls, windows, uncovered openings (e.g., an open doorway), etc. The AR device 400 may determine the surface areas of partial walls, windows, etc. in a similar manner as described with other structural elements. Alternatively, a user may provide the surface areas of these structural elements of the space 604 to the AR device 400.

In some example embodiments, the AR device 400 may also determine the materials of the walls 610, 612, the ceiling 614, the floor 616, and other walls. For example, the AR device 400 may determine or estimate the material of one or more of the walls 610, 612, the ceiling 614, the floor 616, other walls, etc. using acoustic analysis, infrared analysis, and/or the light transmissivity. Alternatively, a user may provide the material information for one or more of the walls 610, 612, the ceiling 614, the floor 616, other walls, etc.

In some example embodiments, to estimate reverberation times (e.g., RT60) at different sound frequencies, the AR device 400 may calculate the total Sabin for the physical space 604 for different frequencies based on acoustic absorption coefficient and surface area as shown in Table 3. For example, Wall 3 in Table 3 may correspond to the wall 610, and Wall 4 may correspond to the wall 612. Wall 1 and Wall 2 may correspond to floor-to-ceiling glass windows (not shown) of the space 604. Ceiling in Table 3 may correspond to the ceiling 614, and Floor in Table 3 may correspond to the floor 616. The Sabins for each surface at different frequencies may be calculated by multiplying the respective surface area by the acoustic absorption coefficient that depends on the material of the respective structural element. For example, the acoustic absorption coefficient for the materials of the walls 610, 612, the ceiling 614, the floor 616, and windows may be obtained from Table 1. If any uncovered opening in a wall of the space 604 (e.g., an open doorway) existed, the acoustic absorption coefficient for the uncovered opening may be set to a 1 or to an apparent value of the adjacent space. The total Sabins for the space 604 at different frequencies may be determined as a sum of the Sabins of the different structural elements.

TABLE 3

| Room Element | Material | Area (ft^2) | Absorption Coefficients Frequency (Hz) | | | Total Sabins Frequency (Hz) | | |
|---|---|---|---|---|---|---|---|---|
| | | | 125 | 250 | 500 | 125 | 250 | 500 |
| Wall 1 | Glass, ordinary window glass | 250 | 0.35 | 0.25 | 0.18 | 87.5 | 62.5 | 45 |
| Wall 2 | Glass, ordinary window glass | 250 | 0.35 | 0.25 | 0.18 | 87.5 | 62.5 | 45 |
| Wall 3 | Gypsum Wall Board | 200 | 0.29 | 0.18 | 0.1 | 58 | 36 | 20 |
| Wall 4 | Gypsum Wall Board | 200 | 0.29 | 0.18 | 0.1 | 58 | 36 | 20 |
| Ceiling | Concrete ceiling | 500 | 0.01 | 0.01 | 0.015 | 5 | 5 | 7.5 |
| Floor | Carpet, light or mat | 500 | 0.05 | 0.1 | 0.15 | 25 | 50 | 75 |
| Air Absorption (4 mV) | | | 0 | 0 | 0 | 0 | 0 | 0 |
| Total | | | | | | 321 | 252 | 212.5 |

In some example embodiments, the AR device 400 may calculate reverberation times, RT60, for each individual frequency, by dividing the volume of the space 604 by the total Sabin for the space as shown in Table 3 and multiplying the result by an RT60 constant value (i.e., absorption coefficient) as can be readily understood by those of ordinary skill in the art with the benefit of this disclosure. To illustrate, the RT60 constant value of 0.049 may be used when dimensions are in unit of feet. The resulting RT60 values are shown in Table 4. The RT60 values in Table 4 are estimates of the RT60 of the space 604 without lighting fixtures and may reasonably match RT60 values that are measured in the space 604 in a manner described with respect to FIG. 2.

TABLE 4

| Frequency (Hz) | 125 | 250 | 500 | 1000 | 2000 | 4000 | 250-2k |
|---|---|---|---|---|---|---|---|
| RT60 (seconds) | 0.76 | 0.97 | 1.15 | 1.11 | 0.91 | 0.85 | 1.04 |

Figure 7A:
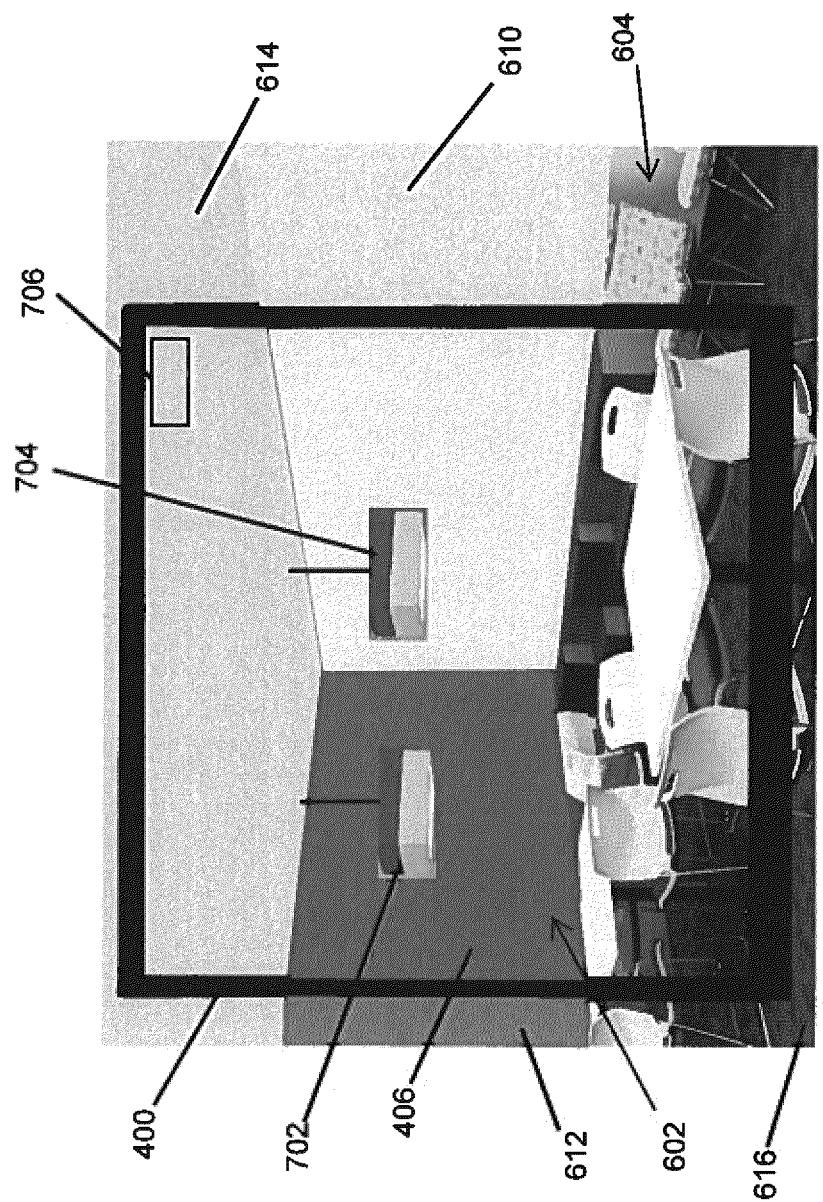
FIG. 7A illustrates a real-time image of a physical space displayed on the AR device of FIG. 4A with overlaid virtual models of lighting fixtures according to another example embodiment.

FIG. 7A illustrates the real-time image 602 of the physical space 604 displayed on the AR device 400 with overlaid virtual models 702, 704 (e.g., 3-D models) of lighting fixtures according to another example embodiment. Referring to FIGS. 4-7A, in some example embodiments, virtual lighting fixture models 702, 704 may be overlaid on the real-time image 602 of the space 604. For example, as part of a lighting design process, a user may select the virtual lighting fixture models 702, 704 using a menu 706 displayed on the viewport 406 and may place the virtual models 702, 704 on the viewport 406. The user may place the virtual models 702, 704 on the viewport 406 at locations corresponding desired locations in the physical space 604. In response to the user input placing the virtual models 702, 704 at the desired locations, the AR device 400 may associate the virtual models 702, 704 with the particular locations and may retain the virtual models 702, 704 anchored to the locations. Lighting design based on virtual lighting fixture models is described in U.S. patent application Ser. No. 15/971,623, the entire content of which is incorporated herein by reference. In some alternative embodiments, the AR device 400 may suggest locations for the virtual models 702, 704.

In some example embodiments, the virtual lighting fixture models 702, 704 may each correspond to a passively sound absorbing light fixture and may have associated data corresponding to estimated reduction in reverberation in various environments. For example, Table 2 above provides a list of lighting fixtures along with respective increases/addition in Sabins, where increases in Sabins correspond to reduction in reverberation. The lighting fixtures listed in Table 2 are expected to be separated from other lighting fixtures with sound absorbing characteristics as indicated in the table. In general, estimated reductions in reverberation resulting from a particular lighting fixture may be associated with parameters such as overall dimensions of a space, material types of structural element such as walls, ceilings, and floors.

In some example embodiments, to estimate the reverberation times, RT60, for the space 604 based on the virtual lighting fixture models 702, 704 and a third virtual lighting fixture model (not shown), the AR device 400 may calculate reverberation times, RT60, for individual frequencies by dividing the volume of the space 604 by the sum of the total Sabin for the space 604 as shown in Table 3 and the corresponding acoustic addition for the respective lighting fixtures as shown in Table 2 followed by multiplying the sum by the RT60 constant value. RT60 values determined based on each of the three lighting fixture models corresponding to LF2 Box (8.5' spacing) in Table 2 are shown in Table 5. Table 6 shows results of comparisons of RT60 values for the space 604 with and without lighting fixtures. As can be seen in Table 6, decreases in RT60 (i.e., decreases in reverberation) may be achieved for each of the frequencies by installing LF2 Box (8.5' spacing) lighting fixtures in the space 604. In some example embodiments, the results in Table 5 may be compared against RT60 values determined from measurements as described with respect to FIG. 2.

TABLE 5

| Frequency (Hz) | 125 | 250 | 500 | 1000 | 2000 | 4000 | 250-2k |
|---|---|---|---|---|---|---|---|
| RT60 (seconds) | 0.53 | 0.66 | 0.73 | 0.68 | 0.57 | 0.55 | 0.66 |

TABLE 6

| Frequency (Hz) | 125 | 250 | 500 | 1000 | 2000 | 4000 | 250-2k |
|---|---|---|---|---|---|---|---|
| % Decrease in RT60 | 30% | 33% | 37% | 38% | 37% | 35% | 36% |

By using the AR device 400, the acoustic characteristics of a space may be estimated prior to installing a lighting fixtures.

In some alternative embodiments, more or fewer than the number of lighting fixture models may be overlaid on the real-time image. In some alternative embodiments, the space 604 may have a different shape than shown. In general, information generated with respect to the space 604 may be used to estimate acoustic performance of other similarly sized spaces.

Figure 7B:
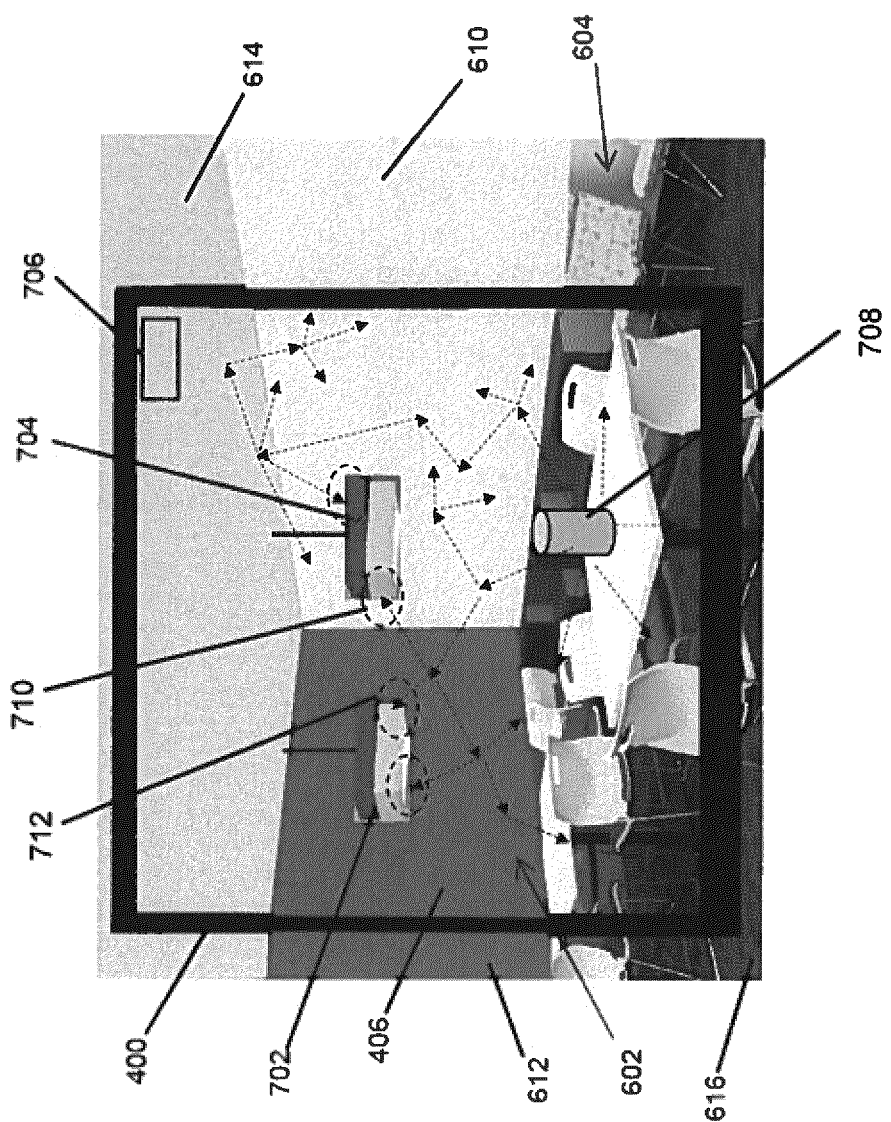
FIG. 7B illustrates the real-time image of the physical space displayed on the AR device of FIG. 4A with overlaid virtual models of lighting fixtures, a virtual model of a sound source, and illustrative travel paths of a sound from the virtual model of the sound source in the physical space according to an example embodiment.

FIG. 7B illustrates the real-time image of the physical space 604 displayed on the AR device 400 with overlaid virtual models 702, 704 of lighting fixtures and a virtual model 708 of a sound source according to another example embodiment. Referring to FIGS. 4-7B, in some example embodiments, a user may overlay a virtual model 708 of a sound source device on the real-time image 602 of the physical space 604 in a similar manner as described with respect to the virtual lighting fixture models 702, 704. After the acoustic performance of the space 604 is estimated based on the virtual lighting fixture models 702, 704 as described with respect to FIG. 7A, the AR device 400 may display illustrative paths of sounds emanating from the virtual model 708. For example, the virtual model 708 may represent a sound source device that has multiple speakers (e.g., six speakers) such that the sound source device can emit sounds in multiple directions as illustrated as by the dotted arrows extending away from the virtual model 708. The sounds from the sound source device represented by the virtual model 708 may be reflected off the walls 610, 612, the ceiling 614, and other surfaces as illustrated in FIG. 7B. Some of the sounds, direct and/or reflected, as represented by the dotted arrows may reach the virtual lighting fixture models 702, 704 at exemplary sound absorption areas 710, 712 of the virtual lighting fixture models 702, 704.

The illustrative sound paths represented by the dotted arrows in FIG. 7B may allow the visual estimation of the impact of installing lighting fixtures corresponding to the virtual lighting fixture models 702, 704 at the particular locations in the space 604. For example, a user may change the location of the virtual model 708 in the real-time image 604 to visually estimate the impact of installing lighting fixtures on a sound source at a different location. A user may also change the locations of the virtual lighting fixture models 702, 704 to enable a visual estimation of the impact of installing lighting fixtures at different locations in the space 604.

In some alternative embodiments, more elaborate illustrative sounds paths may be used visually illustrate estimated acoustic performance of the space 604. In some alternative embodiments, the simplified illustrative sound paths shown in FIG. 7B or more elaborate illustrative sounds paths may be used visually illustrate estimated acoustic performance of the space 604 without lighting fixtures.

Figure 8:
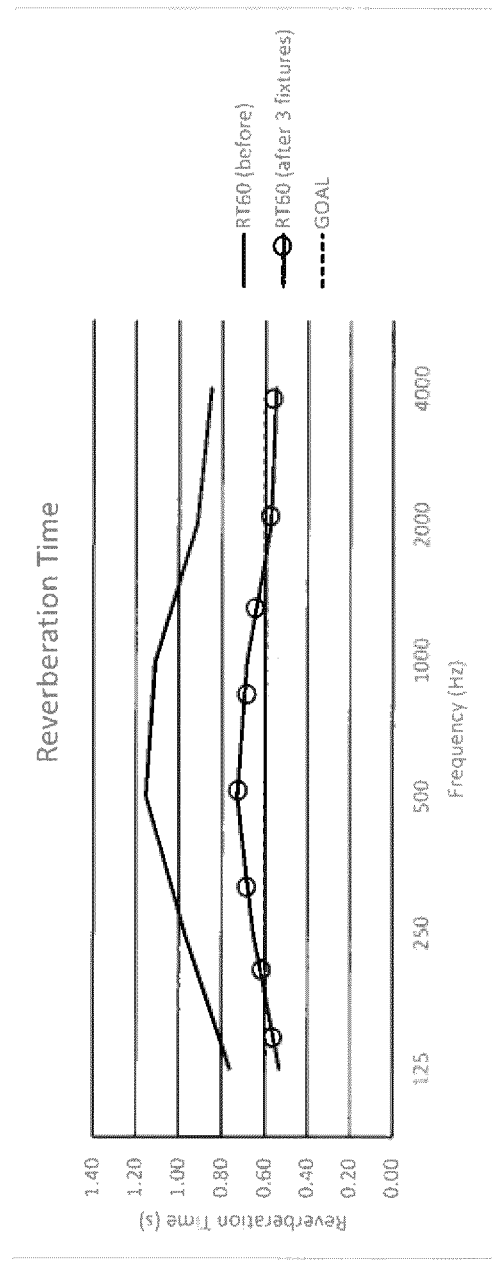
FIG. 8 illustrates a graph showing estimated sound reverberation times of a space with and without lighting fixtures according to an example embodiment.

FIG. 8 illustrates a graph showing estimated sound reverberation times of a space with and without lighting fixtures as described with respect to FIGS. 6 and 7A according to an example embodiment. For example, the graph or one or more results based on the comparison of the sound reverberation times may be displayed on the viewport 406.

In some example embodiments, different sounds may be generated to illustrate the difference between a reverberation time (e.g., RT60 values) of the space 604 when no sound absorbing lighting fixtures are installed and a reverberation time (e.g., RT60 values) of the space 604 if lighting fixtures corresponding to the virtual models 704, 706 are installed in the space 604. Other variations of sounds related to the different reverberation times may be output by the AR device 400 to clearly illustrate the difference in acoustic performance of the space 604 without lighting fixtures and with lighting fixtures corresponding to the virtual models 704, 706.

Figure 9:
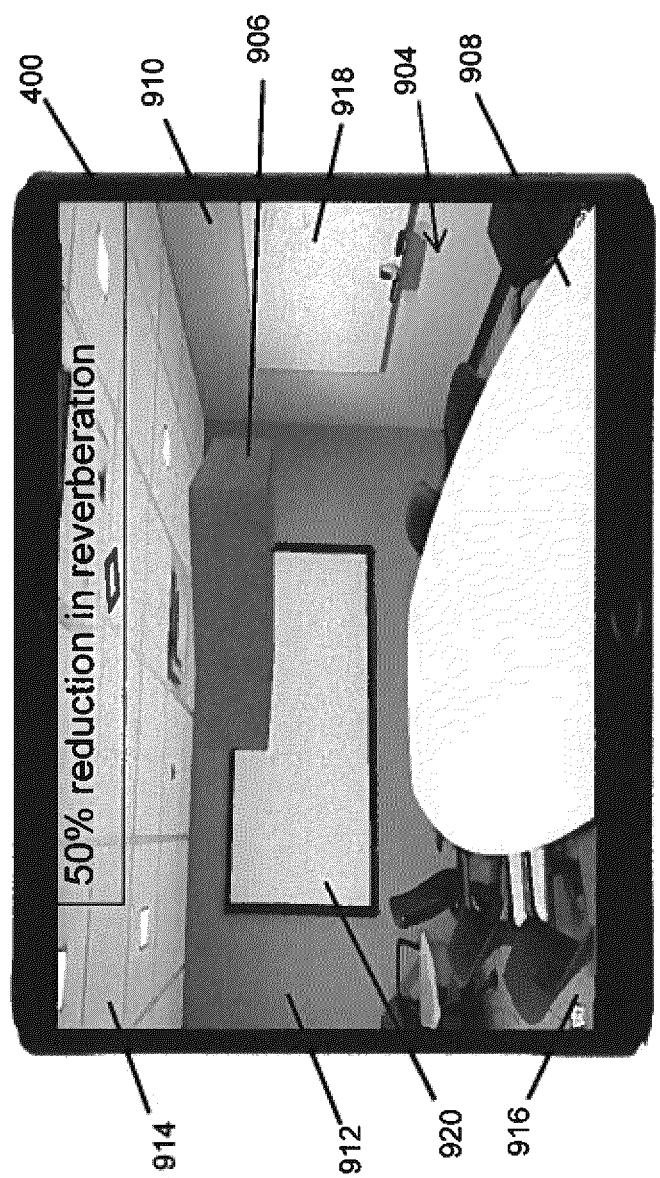
FIG. 9 illustrates a real-time image of a physical space displayed on the AR device of FIG. 4A and a virtual model of a lighting fixture overlaid on a real-time image of a space according to another example embodiment.

FIG. 9 illustrates a real-time image 904 of a physical space displayed on the AR device 400 of FIG. 4A and a virtual model 906 of a lighting fixture overlaid on the real-time image 904 according to another example embodiment. As shown in FIG. 9, the physical space may include walls 910, 912, a ceiling 914, and a floor 916. The space may also include a table 908, a board 918 on the wall 910, and a screen 920 against the wall 912. A virtual lighting fixture model 906 is overlaid on the real-time image 904, for example, in response to a user input to the AR device 400 selecting and placing the virtual lighting fixture model 906 at a particular location of the physical space as displayed in the viewport of the AR device 400.

In some example embodiments, the AR device 400 may identify some or all of the structural elements including the walls 910, 912, the ceiling 914, the floor 916, the table 908, the board 918, and the screen 920 in a similar manner as described above. The AR device 400 may also determine the volume of the space, surface areas of the surfaces of the structural elements, and the materials that the structural elements are made of. Because the board 918 and the screen 920 are close to their respective walls 910, 912, the surface area of the walls 910, 912 may be respectively reduced by the surface areas of the board 918 and the screen 920. In some example embodiments, a user may provide some of the information, such as the surface areas of the surfaces and the type of material (e.g., gypsum, wood, etc.) of the structural elements, to the AR device 400 in a similar manner as described above. The AR device 400 may estimate the reverberation time of the space with and without consideration of the sound absorbing parameter associated with the virtual model 906 in a similar manner as described above. The AR device 400 may display the reduction in reverberation that can be achieved by installing the lighting fixture corresponding to the virtual model 906 in the space.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the scope of the following claims, the scope of which are to be accorded the broadest interpretation so as to encompass modifications and equivalent structures.

What is claimed is:

1. An augmented reality-based acoustic analysis method, comprising:
   identifying structural elements of a space;
   determining structural parameters of the structural elements and a structural parameter of the space;
   displaying, by an augmented reality (AR) device and in response to a user input to the AR device selecting and placing a virtual lighting fixture model at a particular location of the space as displayed in a viewport of the AR device, the virtual lighting fixture model on the viewport of the AR device, wherein the virtual lighting fixture model is overlaid on a real-time image of the space; and
   determining, by the AR device, a sound reverberation time of the space based on at least a sound absorption parameter associated with the virtual lighting fixture model and a sound absorption parameter of the space determined based on the structural parameters of the structural elements and the structural parameter of the space.

2. The method of claim 1, wherein the structural parameters of the structural elements include surface areas of surfaces of the structural elements and materials from which the structural elements are made.

3. The method of claim 2, wherein the structural parameter of the space includes a volume of the space.

4. The method of claim 2, wherein the sound absorption parameter of the space is in Sabin.

5. The method of claim 2, wherein the sound absorption parameter associated with the virtual lighting fixture model is a sound absorption parameter of a lighting fixture represented by the virtual lighting fixture model.

6. The method of claim 1, further calculating a second sound reverberation time of the space without the sound absorbing parameter associated with the virtual lighting fixture model and comparing the second sound reverberation time of the space to the sound reverberation time of the space.

7. The method of claim 6, further comprising displaying, by the AR device, a result of the comparing between the second sound reverberation time of the space to the sound reverberation time of the space.

8. The method of claim 1, wherein the structural elements include a floor, a ceiling, and one and more walls.

9. The method of claim 8, wherein the structural elements include a glass window.

10. The method of claim 1, wherein determining the sound reverberation time of the space is further based on a sound absorption parameter associated with a second virtual lighting fixture model that is overlaid on the real-time image of the space.

11. A non-transitory computer-readable medium of an augmented reality (AR) device, wherein the non-transitory computer-readable medium contains instructions executable by a processor, the instructions comprising:
    displaying a real-time image of a space on a viewport of the AR device;
    receiving user inputs indicating structural parameters of structural elements of the space and a structural parameter of the space;
    receiving user inputs selecting and placing a virtual lighting fixture model at a particular location of the space as displayed in the viewport of the AR device;
    displaying the virtual lighting fixture model overlaid on the real-time image of the space; and
    calculating a sound reverberation time of the space based on at least a sound absorption parameter associated with the virtual lighting fixture model and a sound absorption parameter of the space determined based on the structural parameters of the structural elements and the structural parameter of the space.

12. The non-transitory computer-readable medium of claim 11, wherein the instructions further comprise calculating a second sound reverberation time of the space without the sound absorbing parameter associated with the virtual lighting fixture model and comparing the second sound reverberation time of the space to the sound reverberation time of the space.

13. The non-transitory computer-readable medium of claim 12, wherein the instructions further comprise displaying a result of the comparing between the second sound reverberation time of the space to the sound reverberation time of the space.

* * * * *